United States Patent
Saeki et al.

(10) Patent No.: US 6,835,708 B2
(45) Date of Patent: Dec. 28, 2004

(54) GRAFT POLYMER COMPOSITION AND ITS PRODUCTION PROCESS AND USES

(75) Inventors: Takuya Saeki, Suita (JP); Junichi Nakamura, Takatsuki (JP); Shigeru Yamaguchi, Yao (JP)

(73) Assignee: Nippon Shokubai Co., Ltd., Osaka (JP)

(*) Notice: Subject to any disclaimer, the term of this patent is extended or adjusted under 35 U.S.C. 154(b) by 108 days.

(21) Appl. No.: 10/083,410

(22) Filed: Feb. 27, 2002

(65) Prior Publication Data

US 2002/0173592 A1 Nov. 21, 2002

(30) Foreign Application Priority Data

Mar. 7, 2001 (JP) ........................................ 2001-063926

(51) Int. Cl.[7] .............................................. C08L 51/08
(52) U.S. Cl. .......................... 510/531; 510/533; 525/63
(58) Field of Search ............................ 525/63; 510/531, 510/533

(56) References Cited

U.S. PATENT DOCUMENTS

| | | | |
|---|---|---|---|
| 4,321,342 A | 3/1982 | Davis et al. | |
| 4,612,352 A | 9/1986 | Schafer et al. | ............... 525/404 |
| 4,705,525 A | 11/1987 | Abel et al. | |
| 5,700,872 A | 12/1997 | Wang et al. | |
| 6,063,866 A | 5/2000 | Wang et al. | |
| 6,255,386 B1 | 7/2001 | Wang et al. | |

FOREIGN PATENT DOCUMENTS

| | | |
|---|---|---|
| DE | 40 19 419 A1 | 1/1992 |
| DE | 100 36 713 A1 | 5/2001 |
| EP | 0 011 833 A1 | 6/1980 |
| EP | 0098803 | 1/1984 |
| EP | 0 429 307 A2 | 5/1991 |
| EP | 0639592 | 2/1995 |
| EP | 0 850 963 A1 | 7/1998 |
| JP | 5962614 | 4/1984 |
| JP | 753993 | 8/1993 |
| JP | 753645 | 2/1995 |
| JP | 9192691 | 7/1997 |

*Primary Examiner*—Jeffrey Mullis
(74) *Attorney, Agent, or Firm*—Roylance, Abrams, Berdo & Goodman, L.L.P.

(57) ABSTRACT

The present invention provides a graft polymer composition and its production process and uses, wherein the graft polymer composition is good both in the builder performance and in the compatibility with liquid detergents. The graft polymer composition comprises at least two graft polymers obtained by a process including the step of graft-polymerizing a monoethylenically unsaturated monomer component onto a main chain including a polyether portion, wherein the monoethylenically unsaturated monomer component includes an unsaturated carboxylic monomer as an essential component. And this graft polymer composition is characterized in that there is a difference of not less than 3 in number of carbon atoms in each structural unit which composes ends of the main chain on comparison between two of the at least two graft polymers.

22 Claims, No Drawings

GRAFT POLYMER COMPOSITION AND ITS PRODUCTION PROCESS AND USES

BACKGROUND OF THE INVENTION

A. Technical Field

The present invention relates to a graft polymer composition and its production process and uses, wherein the graft polymer composition is, for example, suitable for liquid-detergent builders.

B. Background Art

Conventionally, a graft polymer which is, for example, obtained by graft-polymerizing an unsaturated carboxylic monomer (e.g. (meth)acrylic acid) onto a polyether compound is widely used for various purposes (e.g. detergent builders) by utilizing its hydrophilicity, wherein the polyether compound is a product formed by a reaction of addition of an alkylene oxide to such as an alcohol.

As to such a graft polymer, however, in the case where the number of carbon atoms in the alcohol composing the aforementioned polyether compound is large, the amount of the carboxylic acid being introduced is limited, and further the builder performance tends to be insufficient. Therefore, for detergent builders, there have favorably been used a graft polymer which is obtained by using a polyether compound which is a product formed by a reaction of addition of an alkylene oxide to such as an alcohol having a comparatively small number of carbon atoms.

However, this graft polymer (which is obtained by using a polyether compound that is a product formed by a reaction of addition of an alkylene oxide to such as an alcohol having a comparatively small number of carbon atoms) involves problems of having so low compatibility with liquid detergents as to be difficult to apply to the liquid detergents.

SUMMARY OF THE INVENTION

A. Object of the Invention

An object of the present invention is to provide a graft polymer composition and its production process and uses, wherein the graft polymer composition is good both in the builder performance and in the compatibility with liquid detergents.

B. Disclosure of the Invention

As a result of diligent study, the present inventors have attained the present invention by finding out that a means of making it possible to satisfy both the builder performance and the compatibility with liquid detergents is to mix at least two graft polymers together wherein between the at least two graft polymers there is a difference of not less than a certain value in number of carbon atoms which compose each structural unit located at both ends of the main chain of each graft polymer. Specifically, a graft polymer (I), having a main chain containing a small number of carbon atoms which compose each structural unit located at ends, has high builder performance by nature, and its inferiority in the compatibility with liquid detergents is solved by the excellent compatibility of a graft polymer (II) having a main chain containing a large number of carbon atoms which compose each structural unit located at ends, whereby the high builder performance of the graft polymer (I) is sufficiently exhibited. On the other hand, the graft polymer (II), having a main chain containing a large number of carbon atoms which compose each structural unit located at ends, by nature cannot be said to have high builder performance, but even if the graft polymer (II) coexists with the graft polymer (I) having a main chain containing a small number of carbon atoms which compose each structural unit located at ends, the graft polymer (II) does not dilute the high builder performance of the graft polymer (I). Therefore, if there is allowed to coexist the graft polymer (I) having a main chain containing a small number of carbon atoms which compose each structural unit located at ends and the graft polymer (II) having a main chain containing a large number of carbon atoms which compose each structural unit located at ends, then it becomes possible to satisfy both the builder performance and the compatibility with liquid detergents.

Thus, a graft polymer composition, according to the present invention, comprises at least two graft polymers obtained by a process including the step of graft-polymerizing a monoethylenically unsaturated monomer component onto a main chain including a polyether portion, wherein the monoethylenically unsaturated monomer component includes an unsaturated carboxylic monomer as an essential component. And this graft polymer composition is characterized in that there is a difference of not less than 3 in number of carbon atoms in the end structural unit when the number of carbon atoms which compose each structural unit located at both ends of the main chain is compared between two of the at least two graft polymers under the following conditions (i) and (ii) where:

(i) a portion ranging from an extremely located ether bond portion to an end is defined as the end structural unit, and when there is a difference in number of carbon atoms between both end structural units of each polymer, whichever is larger is defined as the number of carbon atoms in the end structural unit; and (ii) when an end is a structural unit derived from an alkylene oxide, the number of carbon atoms in this end structural unit is defined as zero.

Specifically, to put the above plainly, the graft polymer composition, according to the present invention, is characterized in that there is a difference of not less than 3 in "number of carbon atoms in the end structural unit" between two of the aforementioned at least two graft polymers, wherein the "number of carbon atoms in the end structural unit" is defined as follows:

(1) a portion ranging from an extremely located ether bond portion to an end is defined as the end structural unit;

(2) when there is a difference in number of carbon atoms between both end structural units of each of the two graft polymers, whichever is larger is defined as the "number of carbon atoms in the end structural unit"; and (3) when an end is a structural unit derived from an alkylene oxide, the "number of carbon atoms in this end structural unit" is defined as zero.

A first production process for a graft polymer composition, according to the present invention, comprises the step of adding a monoethylenically unsaturated monomer component to a mixture of at least two polyether compounds in order to graft-polymerize the monoethylenically unsaturated monomer component at the same time onto the at least two polyether compounds, wherein the monoethylenically unsaturated monomer component includes an unsaturated carboxylic monomer as an essential component; wherein there is a difference of not less than 3 in number of carbon atoms in the end structural unit when the number of carbon atoms which compose each structural unit located at both ends is compared between the at least two polyether compounds under the above conditions (i) and (ii).

A second production process for a graft polymer composition, according to the present invention, comprises the step of blending graft polymers (A) and (A') together, wherein:

the graft polymer (A) is obtained by graft-polymerizing a monoethylenically unsaturated monomer component onto a polyether compound (a), wherein the monoethylenically unsaturated monomer component includes an unsaturated carboxylic monomer as an essential component; and the graft polymer (A') is obtained by graft-polymerizing a monoethylenically unsaturated monomer component onto a polyether compound (a'), wherein the monoethylenically unsaturated monomer component includes an unsaturated carboxylic monomer as an essential component;

wherein there is a difference of not less than 3 in number of carbon atoms in the end structural unit when the number of carbon atoms which compose each structural unit located at both ends is compared between the polyether compounds (a) and (a') under the above conditions (i) and (ii).

A liquid-detergent builder, according to the present invention, comprises the aforementioned graft polymer composition according to the present invention as an essential component.

A liquid detergent composition, according to the present invention, comprises the aforementioned graft polymer composition according to the present invention as an essential component.

These and other objects and the advantages of the present invention will be more fully apparent from the following detailed disclosure.

DETAILED DESCRIPTION OF THE INVENTION

The graft polymer composition, according to the present invention, comprises at least two graft polymers obtained by a process including the step of graft-polymerizing a monoethylenically unsaturated monomer component onto a main chain including a polyether portion, wherein the monoethylenically unsaturated monomer component includes an unsaturated carboxylic monomer as an essential component. And it is important that there is a difference of not less than 3 in number of carbon atoms which compose each structural unit located at both ends of the main chain on comparison between two of the at least two graft polymers under the below-mentioned conditions (i) and (ii). As to compositions which do not comprise such two graft polymers as have therebetween a difference of not less than 3 in number of carbon atoms which compose each structural unit located at ends of the main chain, the compatibility is so insufficient that the effects of the present invention cannot be exhibited.

(i) A portion ranging from an extremely located ether bond portion to an end is defined as the end structural unit, and when there is a difference in number of carbon atoms between both end structural units of each polymer, whichever is larger is defined as the number of carbon atoms in the end structural unit (which may herein be referred to simply as "number of end carbon atoms").

(ii) When an end is a structural unit derived from an alkylene oxide, the number of carbon atoms in this end structural unit is defined as zero.

Incidentally, in the present invention, the comparison in number of end carbon atoms between the graft polymers may, for example, be judged by making a comparison in number of end carbon atoms between main chain components (polyether compounds) as used to produce the graft polymers.

In the present invention, it is favorable that the number of carbon atoms in a structural unit containing the smallest number of carbon atoms among the structural units composing both ends of the respective main chains of the at least two graft polymers is not larger than 5. Thereby the dispersibility and/or the chelating ability can be enhanced.

In the present invention, although the ratio between the at least two graft polymers is not especially limited, it is favorable that a graft polymer having a structural unit containing the largest number of carbon atoms among the structural units composing both ends of the respective main chains of the at least two graft polymers accounts for not less than 30 weight % of the entirety of the graft polymers. Thereby the compatibility can further be enhanced.

The graft polymer composition, according to the present invention, favorably has an acid value of not less than 2.0 meq/g. If the acid value is not less than 2.0 meq/g, excellent performance can be exhibited with regard to the dispersibility and/or the chelating ability.

The graft polymer composition, according to the present invention, favorably has a weight-average molecular weight of 300 to 500,000. In the case where the weight-average molecular weight is more than 500,000, the compatibility and/or the dispersibility tends to be low. On the other hand, in the case where the weight-average molecular weight is less than 300, the chelating ability tends to be low.

The graft polymer composition, according to the present invention, can be obtained by a process in which at least two raw materials of the main chains are used to obtain the at least two graft polymers at the same time, such as the aforementioned first production process according to the present invention, specifically, the process which comprises the steps of: obtaining at least two polyether compounds as a mixture; and thereafter adding a monoethylenically unsaturated monomer component to the resultant mixture in order to graft-polymerize the monoethylenically unsaturated monomer component at the same time onto the at least two polyether compounds, wherein the monoethylenically unsaturated monomer component includes an unsaturated carboxylic monomer as an essential component; wherein there is a difference of not less than 3 in number of carbon atoms which compose each structural unit located at both ends on comparison between the at least two polyether compounds under the above conditions (i) and (ii). In addition, the graft polymer composition, according to the present invention, can be obtained also by a process which comprises the steps of individually obtaining the graft polymers by carrying out the polymerizations separately from each other and thereafter mixing them together, such as the aforementioned second production process according to the present invention, specifically, the process which comprises the steps of: obtaining a graft polymer (A) by graft-polymerizing a monoethylenically unsaturated monomer component onto a polyether compound (a), wherein the monoethylenically unsaturated monomer component includes an unsaturated carboxylic monomer as an essential component; on the other hand, obtaining a graft polymer (A') by graft-polymerizing a monoethylenically unsaturated monomer component onto a polyether compound (a'), wherein the monoethylenically unsaturated monomer component includes an unsaturated carboxylic monomer as an essential component; and thereafter blending together polymer components including the graft polymer (A) and the graft polymer (A'); wherein there is a difference of not less than 3 in number of carbon atoms which compose each structural unit located at both ends on comparison between the polyether compounds (a) and (a') under the above conditions (i) and (ii).

Incidentally, in the above first production process, when the monoethylenically unsaturated monomer component is graft-polymerized at the same time onto the at least two polyether compounds between which there is a difference of not less than 3 in "number of carbon atoms in the end structural unit", not only are there obtained separately at least two graft polymers containing each polyether compound as their respective main chains, but also there are occasions when there is formed a graft polymer having a structure in which the at least two polyether compounds between which there is a difference of not less than 3 in "number of carbon atoms in the end structural unit" are bonded to each other through graft chains as formed by the graft polymerization of the monoethylenically unsaturated monomer component, specifically, there are occasions when there is formed one graft polymer (graft polymer having a plurality of main chains) having a structure in which all the at least two polyether compounds between which there is a difference of not less than 3 in "number of carbon atoms in the end structural unit" are main chains of one polymer and in which these main chains are crosslinked by the graft chains.

Thus, in the graft polymer composition according to the present invention, not only do there exist the aforementioned at least two graft polymers, namely, the at least two graft polymers (graft polymers having a single main chain) between which there is a difference of not less than 3 in "number of carbon atoms in the end structural unit", but also there are occasions when the above "graft polymer (III) having a plurality of main chains" also coexists.

If the graft polymer (II) having a main chain containing a large number of carbon atoms which compose each structural unit located at ends is allowed to coexist with the graft polymer (I) having a main chain containing a small number of carbon atoms which compose each structural unit located at ends, then the inferiority of the graft polymer (I) in the compatibility with liquid detergents can be solved, but as the amount of the graft polymer (I) increases, its compatibility grows to be problematic again. On this occasion, if the "graft polymer (III) having a plurality of main chains" also coexists, the problems of the deterioration of the compatibility thereby become difficult to take place even if the amount of the graft polymer (I) is increased.

In the case where the above first production process is carried out, the mutual ratio between the graft polymers (I) and (II) is determined by the production ratio between them in their polymerization reactions, but if the above second production process is carried out, this mutual ratio can freely be adjusted.

Hereinafter, an explanation is made about the process for obtaining the graft polymer in the aforementioned first and second production processes.

The polyether compound becoming the main chain of the graft polymer can be obtained, for example, by allowing an alkylene oxide to add to an addition-receiving compound.

Examples of the aforementioned addition-receiving compound include those which are selected from the group consisting of alcohols, amines, and carboxylic acids. There are no especial limitations on such as kind or molecular weight thereof if the selection is made in such a manner that between the resultant polyether compounds there can, as is aforementioned, be a difference of not less than a certain value in number of carbon atoms which compose each structural unit located at both ends of the main chain of each polyether compound.

Specific examples of the aforementioned alcohols include: primary aliphatic alcohols with 1 to 22 carbon atoms, such as methanol, ethanol, n-propanol, and n-butanol; aromatic alcohols such as phenol, cresol, ethylphenol, cumylphenol, xylenol, octylphenol, tert-butylphenol, nonylphenol, and naphthol; secondary alcohols with 3 to 18 carbon atoms, such as iso-propyl alcohol and alcohols obtained by a process including the step of oxidizing n-paraffins; tertiary alcohols such as tert-butanol; diols such as ethylene glycol, diethylene glycol, propanediol, butanediol, and propylene glycol; triols such as glycerol and trimethylolpropane; and polyols such as sorbitol.

Specific examples of the aforementioned amines include: aromatic amines such as aniline and naphthylamine; alkylamines with 3 to 22 carbon atoms, such as dodecylamine and stearylamine; and alkyldiamines such as ethylenediamine.

Specific examples of the aforementioned carboxylic acids include acetic acid, propionic acid, butyric acid, caprylic acid, lauric acid, palmitic acid, stearic acid, benzoic acid, succinic acid, and phthalic acid.

Examples of the aforementioned alkylene oxide include those which include at least one member selected from the group consisting of ethylene oxide, propylene oxide, 1-butene oxide, styrene oxide, epichlorohydrin, glycidol, allyl glycidyl ether, phenyl glycidyl ether, and α-olefin oxide as an essential component and, if necessary, further include another alkylene oxide copolymerizable therewith. Particularly, considering the efficiency of grafting the monoethylenically unsaturated monomer component, it is favorable to use ethylene oxide and/or propylene oxide as the essential component of the alkylene oxide. In addition, examples of the above other alkylene oxide include tetrahydrofuran. These alkylene oxides are favorably used in a ratio of not less than 100 mol %, more favorably not less than 300 mol %, to the aforementioned addition-receiving compound.

The reaction mode of the polymerization to obtain the polyether compound by allowing the alkylene oxide to add to the aforementioned addition-receiving compound is not especially limited, but may be, for example, any of the following: 1) anionic polymerization involving the use of basic catalysts such as strong alkalis (e.g. hydroxides and alcoholates of alkaline metals) and alkylamines; 2) cationic polymerization involving the use of catalysts such as metal halides, semi-metal halides, mineral acids, and acetic acid; and 3) coordination polymerization involving the use of combinations of such as alkoxides of metals (e.g. aluminum, iron, zinc), alkaline earth compounds, and Lewis acids.

The aforementioned polyether compound becoming the main chain of the graft polymer may be a derivative from a polyether as obtained by the aforementioned polymerization. Examples of such a derivative include: end-group-converted products obtained by a process including the step of converting an end functional group of the polyether; and crosslinked products obtained by a process including the step of allowing the polyether to react with a crosslinking agent having a plurality of groups, such as carboxyl group, isocyanate group, amino group, and halogen group. Preferable examples of the end-group-converted products include those which are obtained by a process including the step of esterifying at least one end hydroxyl group of the above polyether with: fatty acids with 2 to 22 carbon atoms and acid anhydrides thereof, such as acetic acid and acetic anhydride; or dicarboxylic acids such as succinic acid, succinic anhydride, and adipic acid.

The aforementioned polyether compound becoming the main chain of the graft polymer, favorably, has a number-average molecular weight of 100 to 50,000. In the case where the number-average molecular weight is lower than 100, the graft ratio tends to be so low that much of the polyether compound remains unreacted. On the other hand, in the case where the number-average molecular weight is higher than 50,000, the viscosity tends to be so high that the polyether compound is difficult to handle when the polymerization is carried out. Thus, both cases are disadvantageous.

The aforementioned monoethylenically unsaturated monomer component becoming the graft component of the graft polymer includes an unsaturated carboxylic monomer as an essential component and, if necessary, further includes another unsaturated monomer copolymerizable therewith.

Examples of the aforementioned unsaturated carboxylic monomer include ethylenically unsaturated carboxylic acids such as (meth)acrylic acid, maleic acid, fumaric acid, and maleic anhydride, and these may be used either alone respectively or in combinations with each other. Among them, particularly, at least one member selected from the group consisting of (meth)acrylic acid, maleic acid, fumaric acid, and maleic anhydride is favorable in respect to the polymerizability.

There are no especial limitations on the aforementioned other unsaturated monomer copolymerizable with the aforementioned unsaturated carboxylic monomer if it is a monomer other than the unsaturated carboxylic monomer. Examples thereof include: alkyl (meth)acrylates obtained by a process including the step of carrying out esterification between (meth)acrylic acid and alcohols with 1 to 18 carbon atoms, such as methyl (meth)acrylate, ethyl (meth)acrylate, butyl (meth)acrylate, and cyclohexyl (meth)acrylate; amide-group-containing monomers such as (meth)acrylamide, dimethylacrylamide, and isopropylacrylamide; vinyl esters such as vinyl acetate; alkenes such as ethylene and propylene; aromatic vinyl monomers such as styrene and styrenesulfonic acid; maleimide and derivatives therefrom such as phenylmaleimide and cyclohexylmaleimide; nitrile-group-containing vinyl monomers such as (meth)acrylonitrile; sulfonic-acid-group-containing monomers such as 2-acrylamido-2-methylpropanesulfonic acid, allylsulfonic acid, vinylsulfonic acid, 2-hydroxy-3-allyloxy-1-propanesulfonic acid, and 2-hydroxy-3-butenesulfonic acid; alkyl vinyl ethers such as methyl vinyl ether, ethyl vinyl ether, and butyl vinyl ether; vinyl chloride, vinylidene chloride, allyl alcohol; and other functional-group-containing monomers such as N-vinylpyrrolidone. These may be used either alone respectively or in combinations with each other.

Although not especially limited, the ratio of the aforementioned unsaturated carboxylic monomer in the monoethylenically unsaturated monomer component is favorably not less than 50 weight %, more favorably not less than 70 weight %.

When the aforementioned monoethylenically unsaturated monomer component is graft-polymerized onto the aforementioned polyether compound, the monoethylenically unsaturated monomer component is favorably used in a ratio of 0.1 to 2.5 weight parts per 1 weight part of the polyether compound. In the case where the ratio of the monoethylenically unsaturated monomer component is smaller than 0.1 weight part per 1 weight part of the polyether compound, the performance such as dispersibility and/or chelating ability tends to be insufficient. On the other hand, in the case where the ratio of the monoethylenically unsaturated monomer component is larger than 2.5 weight parts per 1 weight part of the polyether compound, there is a possibility that the viscosity of the reaction system may increase during the graft polymerization so much as to cause gelation.

When the aforementioned monoethylenically unsaturated monomer component is graft-polymerized onto the aforementioned polyether compound, conventional radical initiators can be used as polymerization initiators. Organic peroxides are particularly favorably used as the polymerization initiators.

Examples of the aforementioned organic peroxides include the following:

ketone peroxides such as cyclohexanone peroxide, methyl ethyl ketone peroxide, methylcyclohexanone peroxide, methylacetoacetate peroxide, and 3,3,5-trimethylcyclohexanone peroxide;

peroxyketals such as 1,1-bis(tert-hexylperoxy)-3,3,5-trimethylcyclohexane, 1,1-bis(tert-hexylperoxy)cyclohexane, 1,1-bis(tert-butylperoxy)-3,3,5-trimethylcyclohexane, 1,1-bis(tert-butylperoxy)-2-methylcyclohexane, 1,1-bis(tert-butylperoxy)cyclohexane, 2,2-bis(tert-butylperoxy)butane, n-butyl-4,4-bis(tert-butylperoxy)valerate, and 2,2-bis(tert-butylperoxy)octane;

hydroperoxides such as p-menthane hydroperoxide, diisopropylbenzene hydroperoxide, 1,1,3,3-tetramethylbutyl hydroperoxide, cumene hydroperoxide, tert-hexyl hydroperoxide, tert-butyl hydroperoxide, 2,5-dimethylhexane-2,5-dihydroperoxide, and 2-(4-methylcyclohexyl)propane hydroperoxide;

dialkyl peroxides such as α,α'-bis(tert-butylperoxy)-p-diisopropylbenzene, dicumyl peroxide, 2,5-dimethyl-2,5-bis(tert-butylperoxy)hexane, tert-butyl cumyl peroxide, di-tert-butyl peroxide, 2,5-dimethyl-2,5-bis(tert-butylperoxy)hexyne-3, and α,α'-bis(tert-butylperoxy)-p-isopropylhexyne;

diacyl peroxides such as isobutyryl peroxide, 3,3,5-trimethylcyclohexanoyl peroxide, octanoyl peroxide, lauroyl peroxide, stearoyl peroxide, succinic acid peroxide, m-toluyl peroxide, benzoyl peroxide, acetyl peroxide, decanoyl peroxide, and 2,4-dichlorobenzoyl peroxide;

peroxydicarbonates such as di-n-propyl peroxydicarbonate, di-isopropyl peroxydicarbonate, bis-(4-tert-butylcyclohexyl) peroxydicarbonate, di-2-ethoxyethyl peroxydicarbonate, di-2-ethylhexyl peroxydicarbonate, di-3-methoxybutyl peroxydicarbonate, di-sec-butyl peroxydicarbonate, di(3-methyl-3-methoxybutyl) peroxydicarbonate, dimyristyl peroxydicarbonate, dimethoxyisopropyl peroxydicarbonate, and diallyl peroxydicarbonate;

peroxyesters such as α,α'-bis(neodecanoperoxy)diisopropylbenzene, cumyl peroxyneodecanoate, 1,1,3,3-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxypivalate, tert-butyl peroxypivalate, 1,1,3,3-tetramethylbutyl peroxy-2-ethylhexanoate, 2,5-dibutyl-2,5-bis(2-ethylhexanoylperoxy)hexane, 1-cyclohexyl-1-methylethyl peroxy-2-ethylhexanoate, tert-hexyl peroxy-2-ethylhexanoate, tert-butyl peroxy-2-ethylhexanoate, tert-butyl peroxyisobutyrate, tert-hexyl peroxyisopropyl monocarbonate, tert-butyl peroxymaleate, tert-butyl peroxy-3,5,5-trimethylcyclohexanoate, tert-butyl peroxylaurate, 2,5-dibutyl-2,5-bis(m-toluylperoxy)hexane, tert-butyl peroxyisopropyl monocarbonate, tert-butyl peroxy-2-ethylhexyl monocarbonate, tert-hexyl peroxybenzoate, 2,5-dimethyl-2,5-bis(benzoylperoxy)hexane, tert-butyl peroxyacetate, tert-butyl peroxy-m-toluylbenzoate, tert-butyl peroxybenzoate, bis(tert-butylperoxy)isophthalate, cumyl peroxyoctoate, tert-hexyl peroxyneohexanoate, and cumyl peroxyneohexanoate; and other organic peroxides such as tert-butyl peroxyallyl carbonate, tert-butyltrimethylsilyl peroxide, and acetylcyclohexylsulfonyl peroxide. These may be used either alone respectively or in combinations with each other.

Although not especially limited, the amount of the aforementioned organic peroxide used is favorably in the range of 0.1 to 30 weight %, more favorably 0.5 to 20 weight %, of the monoethylenically unsaturated monomer component. In the case where the amount of the organic peroxide is smaller than 0.1 weight %, the ratio of grafting onto the polyether compound tends to be low. On the other hand, in the case where the amount of the organic peroxide is larger than 30 weight %, there are economical disadvantages in that the organic peroxide is expensive. It is favorable that the organic peroxide is added simultaneously with the ethylenically unsaturated monomer component and separately therefrom without beforehand being mixed with the polyether compound. However, the organic peroxide may beforehand be added either to the polyether compound or to the monoethylenically unsaturated monomer component.

A decomposition catalyst for organic peroxides, and/or a reducible compound may be used together with the aforementioned organic peroxide when the aforementioned monoethylenically unsaturated monomer component is graft-polymerized onto the aforementioned polyether compound.

Examples of the aforementioned decomposition catalyst for organic peroxides include: metal halides such as lithium chloride and lithium bromide; metal oxides such as titanium oxide and silicon dioxide; metal salts of inorganic acids such as hydrochloric acid, hydrobromic acid, perchloric acid, sulfuric acid, and nitric acid; carboxylic acids such as formic acid, acetic acid, propionic acid, butyric acid, isobutyric acid, and benzoic acid, and their esters and metal salts; heterocyclic amines such as pyridine, indole, imidazole, and carbazole, and derivatives therefrom. These may be used either alone respectively or in combinations with each other.

Examples of the aforementioned reducible compound include: organometallic compounds such as ferrocene; inorganic compounds which can generate metal ions (e.g. iron, copper, nickel, cobalt, manganese), such as iron naphthenate, copper naphthenate, nickel naphthenate, cobalt naphthenate, and manganese naphthenate; inorganic compounds such as boron trifluoride-ether adducts, potassium permanganate, and perchloric acid; sulfur-containing compounds such as sulfur dioxide, sulfite salts, sulfate esters, bisulfite salts, thiosulfate salts, sulfoxylate salts, and homologues of cyclic sulfinic acids (e.g. benzenesulfinic acid and substituted products thereof, and p-toluenesulfinic acid); mercapto compounds such as octylmercaptan, dodecylmercaptan, mercaptoethanol, α-mercaptopropionic acid, thioglycolic acid, thiopropionic acid, α-thiopropionic acid sodium-sulfopropyl ester, and α-thiopropionic acid sodium-sulfoethyl ester; nitrogen-containing compounds such as hydrazine, β-hydroxyethylhydrazine, and hydroxylamine; aldehydes such as formaldehyde, acetaldehyde, propionaldehyde, n-butyraldehyde, isobutyraldehyde, and isovaleraldehyde; and ascorbic acid. These may be used either alone respectively or in combinations with each other.

When the aforementioned monoethylenically unsaturated monomer component is graft-polymerized onto the aforementioned polyether compound, the polymerization may be conducted either in a substantially solvent-free system or with a solvent. In the case where the solvent is used, its amount is favorably not larger than 20 weight % of the whole reaction system, because, if the amount of the solvent is larger than 20 weight % of the whole reaction system, the graft ratio of the monoethylenically unsaturated monomer component tends to be low. In the case where the viscosity of the reaction system is high, there are occasions when the use of a small amount of solvent to dilute the reaction system is preferable for handling. The used solvent may be distilled off from the reaction system, if necessary. However, in the case where the graft polymer composition according to the present invention is used for liquid-detergent builders and/or liquid detergent compositions, it is favorable that the solvent is not removed, but that the graft polymer composition is used as it is in a state of a liquid containing the solvent.

Although there is no particular limitation, preferable as the aforementioned solvent are such that the constant of chain transfer of the monomer (as used) to the solvent is as small as possible, and such as have boiling points of not lower than 80° C. so as to be usable for the reaction under normal pressure. Examples of such a solvent include: alcohols such as iso-butyl alcohol, n-butyl alcohol, tert-butyl alcohol, ethylene glycol, diethylene glycol, triethylene glycol, propylene glycol, ethylene glycol monoalkyl ethers, and propylene glycol monoalkyl ethers; diethers such as ethylene glycol dialkyl ethers and propylene glycol dialkyl ethers; and acetic compounds such as acetic acid, ethyl acetate, propyl acetate, butyl acetate, acetic acid esters of ethylene glycol monoalkyl ethers, and acetic acid esters of propylene glycol monoalkyl ethers. These may be used either alone respectively or in combinations with each other. Examples of the alkyl group in the above alcohols and diethers include methyl, ethyl, propyl, and butyl.

Although not especially limited, the temperature in the aforementioned graft polymerization step is favorably not lower than 80° C., more favorably in the range of 90 to 160° C. In the case where the temperature is lower than 80° C., the graft polymerization is so difficult to run that the graft ratio of the monoethylenically unsaturated monomer component tends to be low. On the other hand, in the case where the temperature is higher than 160° C., there is a possibility that the polyether compound and the resulting graft polymer may pyrolyze.

When the aforementioned monoethylenically unsaturated monomer component is graft-polymerized onto the aforementioned polyether compound, it is favorable that a part or the whole of the aforementioned polyether compound is charged in the initial stage. For example, in the case where at least one monomer (X) selected from the group consisting of maleic acid, fumaric and, and maleic anhydride is used together with (meth)acrylic acid as the monoethylenically unsaturated monomer components and where these monoethylenically unsaturated monomer components are graft-polymerized onto the polyether compound, it is favorable to carry out the graft polymerization by a process including the steps of: beforehand mixing at least half the whole monomer (X) with the polyether compound; and then heating the resultant mixture to not lower than 80° C.; and then separately adding the residual monoethylenically unsaturated monomer components and, if necessary, the aforementioned organic peroxide to the heated mixture. This process makes it possible to easily control the molecular weight of the resulting graft polymer.

In the present invention, each graft polymer favorably has a weight-average molecular weight in the range of 300 to 500,000. In the case where the weight-average molecular weight is more than 500,000, the compatibility and/or the dispersibility tends to be low. On the other hand, in the case where the weight-average molecular weight is less than 300, the chelating ability tends to be low.

The liquid-detergent builder, according to the present invention, comprises the aforementioned graft polymer composition according to the present invention as an essential component. Specifically, the liquid-detergent builder, according to the present invention, may comprise only the aforementioned graft polymer composition or may further comprise other conventional detergent builders.

Incidentally, the effect to which it is mentioned above that the liquid-detergent builder, according to the present invention, comprises the graft polymer composition as an essential component is that it is enough for this liquid-detergent builder to comprise, as the graft polymers, at least two graft polymers obtained by a process including the step of graft-polymerizing a monoethylenically unsaturated monomer component onto a main chain including a polyether portion, wherein the monoethylenically unsaturated monomer component includes an unsaturated carboxylic monomer as an essential component, wherein there is a difference of not less than 3 in number of carbon atoms in the end structural unit when the number of carbon atoms which compose each structural unit located at both ends of the main chain is compared between two of the aforementioned at least two graft polymers under the aforementioned conditions (i) and (ii). This effect accordingly means not only that the at least two graft polymers having relations in which there is a difference of not less than 3 in number of carbon atoms in the end structural unit when compared under the aforementioned conditions (i) and (ii) are used in the form where these at least two graft polymers are beforehand intermingled as raw materials combined into the liquid-detergent builder, but also that as a result of separate addition of the at least two graft polymers having the above relations, these graft polymers come into a state of coexisting in the liquid-detergent builder.

Although not especially limited, examples of the aforementioned other detergent builders include sodium tripolyphosphate, sodium pyrophosphate, sodium silicate, mirabilite, sodium carbonate, sodium nitrilotriacetate, sodium or potassium ethylenediaminetetraacetate, zeolite, carboxyl derivatives from polysaccharides, and water-soluble polymers such as (meth)acrylic acid (co)polymer salts and fumaric acid (co)polymer salts. Incidentally, the ratio of these other detergent builders as added may fitly be set within the range not damaging the effects of the present invention.

The liquid-detergent builder, according to the present invention, exhibits so excellent compatibility with surfactants as to be able to form therefrom high-concentrated liquid detergent compositions, and is therefore suitable for liquid detergents. Because of such excellence in the compatibility of the liquid-detergent builder with surfactants, liquid detergent compositions prepared therefrom are given so good transparency that problems of separation of liquid detergents, which problems are caused by turbidity, can be prevented. Furthermore, because of the above excellence in the compatibility, high-concentrated liquid detergent compositions can be prepared, therefore also leading to the enhancement of the detergency of the liquid detergents.

Because the liquid-detergent builder, according to the present invention, comprises the graft polymer composition according to the present invention, this liquid-detergent builder can exhibit excellent clay dispersibility and favorably exhibits a clay dispersibility (calcium carbonate 50 ppm) of not less than 0.3, more favorably not less than 0.5, still more favorably not less than 0.7, particularly favorably not less than 0.9. In the case where the clay dispersibility (calcium carbonate 50 ppm) is less than 0.3, there are disadvantages in that inferior effects are provided with regard to the enhancement of the detergency particularly for mud dirt in the use as liquid-detergent builders.

The liquid detergent composition, according to the present invention, comprises the aforementioned graft polymer composition according to the present invention as an essential component.

Incidentally, the effect to which it is mentioned above that the liquid detergent composition, according to the present invention, comprises the graft polymer composition as an essential component is that it is enough for this liquid detergent composition to comprise, as the graft polymers, at least two graft polymers obtained by a process including the step of graft-polymerizing a monoethylenically unsaturated monomer component onto a main chain including a polyether portion, wherein the monoethylenically unsaturated monomer component includes an unsaturated carboxylic monomer as an essential component, wherein there is a difference of not less than 3 in number of carbon atoms in the end structural unit when the number of carbon atoms which compose each structural unit located at both ends of the main chain is compared between two of the aforementioned at least two graft polymers under the aforementioned conditions (i) and (ii). This effect accordingly means not only that the at least two graft polymers having relations in which there is a difference of not less than 3 in number of carbon atoms in the end structural unit when compared under the aforementioned conditions (i) and (ii) are used in the form where these at least two graft polymers are beforehand intermingled as raw materials combined into the liquid detergent composition, but also that as a result of separate addition of the at least two graft polymers having the above relations, these graft polymers come into a state of coexisting in the liquid detergent composition.

The combining ratio of the graft polymer composition according to the present invention, as contained in the liquid detergent composition according to the present invention, is usually in the range of 0.1 to 60 weight %, favorably 1 to 30 weight %, of the liquid detergent composition. In the case where the combining ratio of the graft polymer composition according to the present invention is less than 0.1 weight %, sufficient detergency cannot be exhibited. On the other hand, in the case where the combining ratio of the graft polymer composition according to the present invention is more than 60 weight %, economical advantage is deteriorated.

The liquid detergent composition, according to the present invention, usually further comprises a surfactant for detergents besides the aforementioned graft polymer composition according to the present invention. Examples of the surfactant include anionic surfactants, nonionic surfactants, cationic surfactants and amphoteric surfactants, and these may be used either alone respectively or in combinations with each other.

Specific examples of the anionic surfactant include alkylbenzenesulfonate salts, alkyl or alkenyl ether sulfate salts, alkyl or alkenyl sulfate salts, a-olefinsulfonate salts, α-sulfofatty acids or ester salts thereof, alkanesulfonate salts, saturated or unsaturated fatty acid salts, alkyl or alkenyl ether carboxylate salts, amino acid type surfactants, N-acylamino acid type surfactants, and alkyl or alkenyl phosphate esters or salts thereof.

Specific examples of the nonionic surfactant include polyoxyalkylene alkyl or alkenyl ethers, polyoxyethylene alkyl phenyl ethers, higher fatty acid alkanolamides or alkylene oxide adducts thereof, sucrose fatty acid esters, alkyl glycoxides, fatty acid glycerol monoesters, and alkylamine oxides.

Specific examples of the cationic surfactant include quaternary ammonium salts.

Specific examples of the amphoteric surfactant include carboxyl type or sulfobetaine type amphoteric surfactants.

The combining ratio of the aforementioned surfactant in the liquid detergent composition is usually in the range of 10 to 60 weight %, favorably 15 to 50 weight %, of the liquid detergent composition. In the case where the combining ratio of the surfactant is less than 10 weight %, sufficient detergency cannot be exhibited. On the other hand, in the case where the combining ratio of the surfactant is more than 60 weight %, economical advantage is deteriorated.

To the liquid detergent composition according to the present invention, there can be added various additives which are conventionally used for detergents. Specific examples thereof include: sodium carboxymethyl cellulose to prevent resettlement and reattachment of contaminants; contamination inhibitors such as benzotriazole and ethylenethiourea; alkaline substances for pH adjustment; perfumes; fluorescent agents; colorants; foaming agents; foam stabilizers; lustering agents; fungicides; bleachers; enzymes; dyes; and solvents. Incidentally, the ratio of these additives as added may fitly be set within the range not damaging the effects of the present invention.

Because of the excellence in the compatibility of the graft polymer composition with surfactants, the liquid detergent composition according to the present invention is given so good transparency that problems of separation of liquid detergents, which problems are caused by turbidity, can be prevented. Furthermore, because of the above excellence in the compatibility, this liquid detergent composition is usable in high-concentrated form, therefore also leading to the enhancement of the detergency of the liquid detergents.

The turbidity (kaolin turbidity) measured with a turbidimeter is useful as one of indexes of the excellence in the compatibility, and the turbidity value at 25° C. of the liquid detergent composition according to the present invention is favorably not greater than 200 mg/l, more favorably not greater than 100 mg/l, still more favorably not greater than 50 mg/l.

(Effects and Advantages of the Invention):

The graft polymer composition, according to the present invention, comprises coexistence of the graft polymer (I) having a main chain containing a small number of carbon atoms which compose each structural unit located at ends and the graft polymer (II) having a main chain containing a large number of carbon atoms which compose each structural unit located at ends, therefore the low compatibility of the graft polymer (I) is solved by the excellent compatibility of the graft polymer (II), whereby the graft polymer (I) sufficiently exhibits its high builder performance. The graft polymer (II) itself cannot be said to have high builder performance, but even if the graft polymer (II) coexists with the graft polymer (I), the graft polymer (II) does not dilute the high builder performance of the graft polymer (I). Therefore, the graft polymer composition, according to the present invention, has high builder performance and further is also possessed sufficiently of the compatibility with liquid detergents.

Thus, the present invention can provide a graft polymer composition, its production process, and a liquid-detergent builder and a liquid detergent composition, both of which comprise the graft polymer composition, wherein the graft polymer composition is good both in the builder performance and in the compatibility with liquid detergents.

DETAILED DESCRIPTION OF THE PREFERRED EMBODIMENTS

Hereinafter, the present invention is more specifically illustrated by the following examples of some preferred embodiments. However, the present invention is not limited thereto.

The weight-average molecular weight of the resultant graft polymer (composition) was measured by gel permeation chromatography (GPC) under the following conditions:

Instrument: L-7000 series produced by Hitachi Co., Ltd.

Detector: RI

Columns: SB-G, SB-804, SB-803, and SB-802.5 produced by Showa Denko Co., Ltd.

Column temperature: 40° C.

Calibration curve: POLYACRYLIC ACID STANDARD produced by Sowa Kagaku Co., Ltd.

GPC soft: BORWIN produced by Nippon Bunko Co., Ltd.

Eluent: 0.1 M phosphoric acid buffer/acetonitrile=9/1 (weight ratio), pH=8.0

In addition, the acid value of the resultant graft polymer (composition) was calculated by titration with an aqueous 0.1 N-NaOH solution.

EXAMPLE 1

A separable flask of 300 ml in capacity with a stirrer, a condenser, a thermometer, a nitrogen-introducing tube, and dropping funnels was charged with 102.4 g of polyethylene glycol (produced by a reaction of addition of 7 moles of ethylene oxide to an alkyl alcohol having 12 carbon atoms; hereinafter referred to as "LC-7"), 25.6 g of polyethylene glycol (produced by a reaction of addition of 10 moles of ethylene oxide to methanol; hereinafter referred to as "PM-10"), 18.9 g of maleic anhydride, and 0.7 g of pure water. Internal air of the flask was replaced with nitrogen for about 1 hour, and then the resultant mixture was heated to 130° C. while being stirred. When the temperature reached 130° C., 32.5 g of 100% acrylic acid solution and 4.39 g of di-tert-butyl peroxide (hereinafter referred to as "PBD") were dropwise added over periods of 180 minutes and 120 minutes respectively. After this dropwise addition had ended, the resultant reaction mixture was aged at the same temperature (130±3° C.) for 90 minutes to complete the polymerization. The resultant polymer composition had a weight-average molecular weight of 6,600 and an acid value of 3.59 meq/g. Incidentally, 12 and 1 respectively were the numbers of end carbon atoms in the respective main chains of two graft polymers as contained in the resultant polymer composition, therefore the difference therebetween was 11.

EXAMPLE 2

A separable flask of 300 ml in capacity with a stirrer, a condenser, a thermometer, a nitrogen-introducing tube, and dropping funnels was charged with 89.6 g of "LC-7", 38.4 g of "PM-10", and 29.5 g of maleic anhydride. Internal air of the flask was replaced with nitrogen for about 1 hour, and then the resultant mixture was heated to 130° C. while being stirred. When the temperature reached 130° C., 50.5 g of 100% acrylic acid solution and 6.8 g of "PBD" were dropwise added over periods of 180 minutes and 120 minutes respectively After this dropwise addition had ended, the resultant reaction mixture was aged at the same temperature (130±3° C.) for 90 minutes to complete the polymerization. The resultant polymer composition had a weight-average molecular weight of 8,000 and an acid value of 4.33 meq/g. Incidentally, 12 and 1 respectively were the numbers of end carbon atoms in the respective main chains of two graft polymers as contained in the resultant polymer composition, therefore the difference therebetween was 11.

EXAMPLE 3

A separable flask of 300 ml in capacity with a stirrer, a condenser, a thermometer, a nitrogen-introducing tube, and dropping funnels was charged with 84 g of polyethylene glycol (produced by a reaction of addition of 20 moles of ethylene oxide to n-hexyl alcohol; hereinafter referred to as "HEX-20"), 56 g of "PM-10", 20.7 g of maleic anhydride, and 0.4 g of pure water. Internal air of the flask was replaced with nitrogen for about 1 hour, and then the resultant mixture was heated to 130° C. while being stirred. When the temperature reached 130° C., 35.5 g of 100% acrylic acid solution and 4.1 g of "PBD" were dropwise added over a period of 150 minutes each. After this dropwise addition had ended, the resultant reaction mixture was aged at the same temperature (130±3° C.) for 90 minutes to complete the polymerization. The resultant polymer composition had a weight-average molecular weight of 9,100 and an acid value of 3.25 meq/g. Incidentally, 6 and 1 respectively were the numbers of end carbon atoms in the respective main chains of two graft polymers as contained in the resultant polymer composition, therefore the difference therebetween was 5.

EXAMPLE 4

A separable flask of 500 ml in capacity with a stirrer, a condenser, a thermometer, a nitrogen-introducing tube, and dropping funnels was charged with 130 g of polyethylene glycol (produced by a reaction of addition of 3 moles of ethylene oxide to an alkyl alcohol having 12 carbon atoms; hereinafter referred to as "LC-3"), 130 g of "PM-10", 59.8 g of maleic anhydride, and 1.1 g of pure water. Internal air of the flask was replaced with nitrogen for about 1 hour, and then the resultant mixture was heated to 130° C. while being stirred. When the temperature reached 130° C., 102.5 g of 100% acrylic acid solution and 13.9 g of "PBD" were dropwise added over periods of 150 minutes and 180 minutes respectively. After this dropwise addition had ended, the resultant reaction mixture was aged at the same temperature (130±3° C.) for 90 minutes to complete the polymerization. The resultant polymer composition had a weight-average molecular weight of 15,600 and an acid value of 4.91 meq/g. Incidentally, 12 and 1 respectively were the numbers of end carbon atoms in the respective main chains of two graft polymers as contained in the resultant polymer composition, therefore the difference therebetween was 11.

COMPARATIVE EXAMPLE 1

A separable flask of 300 ml in capacity with a stirrer, a condenser, a thermometer, a nitrogen-introducing tube, and dropping funnels was charged with 200 g of "PM-10", 29.6 g of maleic anhydride, and 1.1 g of pure water. Internal air of the flask was replaced with nitrogen for about 1 hour, and then the resultant mixture was heated to 120° C. while being stirred. When the temperature reached 120° C., 50.7 g of 100% acrylic acid solution and 5.1 g of tert-butyl peroxybenzoate (hereinafter referred to as "PBZ") were dropwise added over a period of 150 minutes each. After this dropwise addition had ended, the resultant reaction mixture was aged at the sane temperature (120±3° C.) for 2 hours to complete the polymerization. The resultant polymer had a weight-average molecular weight of 8,300 and an acid value of 2.95 meq/g. Incidentally, 1 was the number of end carbon atoms in the main chain of the resultant polymer.

COMPARATIVE EXAMPLE 2

A separable flask of 300 ml in capacity with a stirrer, a condenser, a thermometer, a nitrogen-introducing tube, and dropping funnels was charged with 200 g of polyethylene glycol (produced by a reaction of addition of 30 moles of ethylene oxide to phenol; hereinafter referred to as "PH-30") and 7.6 g of maleic acid. Internal air of the flask was replaced with nitrogen for about 1 hour, and then the resultant mixture was heated to 135° C. while being stirred. When the temperature reached 135° C., 42.4 g of 100% acrylic acid solution and 3.0 g of "PBD" were dropwise added over a period of 150 minutes each. After this dropwise addition had ended, the resultant reaction mixture was aged at the same temperature (135±3° C.) for 2 hours to complete the polymerization. The resultant polymer had a weight-average molecular weight of 6,800 and an acid value of 3.04 meq/g. Incidentally, 6 was the number of end carbon atoms in the main chain of the resultant polymer.

COMPARATIVE EXAMPLE 3

A separable flask of 1,000 ml in capacity with a stirrer, a condenser, a thermometer, a nitrogen-introducing tube, and dropping funnels was charged with 300 g of "LC-7", 131.2 g of maleic anhydride, and 2.4 g of pure water. Internal air of the flask was replaced with nitrogen for about 1 hour, and then the resultant mixture was heated to 130° C. while being stirred. When the temperature reached 130° C., an attempt was made to dropwise add 144.7 g of 100% acrylic acid solution and 15.0 g of PBD over a period of 120 minutes each. However, after about 110 minutes from the start of this dropwise addition, the reaction was ended, because the viscosity of the reaction liquid became too high to stir it. The resultant polymer was a gelled material that was insoluble in water.

COMPARATIVE EXAMPLE 4

A separable flask of 300 ml in capacity with a stirrer, a condenser, a thermometer, a nitrogen-introducing tube, and dropping funnels was charged with 60 g of "PM-10", 140 g of polyethylene glycol (produced by a reaction of addition of 25 moles of ethylene oxide to ethanol; hereinafter referred to as "EM-25"), 35 g of maleic acid, and 1.5 g of pure water. Internal air of the flask was replaced with nitrogen for about 1 hour, and then the resultant mixture was heated to 130° C. while being stirred. When the temperature reached 130° C., 50.7 g of 100% acrylic acid solution and 5.1 g of "PBZ" were dropwise added over a period of 150 minutes each. After this dropwise addition had ended, the resultant reaction mixture was aged at the same temperature (130±3° C.) for 120 minutes to complete the polymerization. The resultant polymer composition had a weight-average molecular weight of 6,500 and an acid value of 3.14 meq/g. Incidentally, 2 and 1 respectively were the numbers of end carbon atoms in the respective main chains of two graft polymers as contained in the resultant polymer composition, therefore the difference therebetween was 1.

EXAMPLE 5

The polymer as obtained in Comparative Example 1 and the polymer as obtained in Comparative Example 2 were blended together in a weight ratio of 7/3, thus obtaining a polymer composition. The resultant polymer composition had a weight-average molecular weight of 7,100 and an acid value of 3.03 meq/g. Incidentally, 6 and 1 respectively were the numbers of end carbon atoms in the respective main chains of two graft polymers as contained in the resultant polymer composition, therefore the difference therebetween was 5.

EXAMPLE 6

The polymer as obtained in Comparative Example 1 and the polymer as obtained in Comparative Example 2 were blended together in a weight ratio of 5/5, thus obtaining a polymer composition. The resultant polymer composition had a weight-average molecular weight of 7,600 and an acid value of 3.07 meq/g. Incidentally, 6 and 1 respectively were the numbers of end carbon atoms in the respective main chains of two graft polymers as contained in the resultant polymer composition, therefore the difference therebetween was 5.

EXAMPLE 7

The polymer as obtained in Comparative Example 1 and the polymer as obtained in Comparative Example 2 were blended together in a weight ratio of 3/7, thus obtaining a polymer composition. The resultant polymer composition had a weight-average molecular weight of 7,000 and an acid value of 3.01 meq/g. Incidentally, 6 and 1 respectively were the numbers of end carbon atoms in the respective main chains of two graft polymers as contained in the resultant polymer composition, therefore the difference therebetween was 5.

EXAMPLE 8

A separable flask of 300 ml in capacity with a stirrer, a condenser, a thermometer, a nitrogen-introducing tube, and dropping funnels was charged with 120 g of "PM-10", 62.6 g of maleic anhydride, and 1.2 g of pure water. Internal air of the flask was replaced with nitrogen for about 1 hour, and then the resultant mixture was heated to 130° C. while being stirred. When the temperature reached 130° C., 46 g of 100% acrylic acid solution and 7.8 g of "PBZ" were dropwise added over a period of 160 minutes each. After this dropwise addition had ended, the resultant reaction mixture was aged at the same temperature (130±3° C.) for 2 hours to complete the polymerization, thus obtaining a polymer A.

Separately, a separable flask of 300 ml in capacity with a stirrer, a condenser, a thermometer, a nitrogen-introducing tube, and dropping funnels was charged with 128 g of "LC-7" and 22.4 g of maleic acid. Internal air of the flask was replaced with nitrogen for about 1 hour, and then the resultant mixture was heated to 130° C. while being stirred. When the temperature reached 130° C., 32.5 g of 100% acrylic acid solution and 4.39 g of "PBD" were dropwise added over a period of 150 minutes each. After this dropwise addition had ended, the resultant reaction mixture was aged at the same temperature (130±3° C.) for 2 hours to complete the polymerization, thus obtaining a polymer B.

The resultant polymers A and B were blended together in a weight ratio of 8/2, thus obtaining a polymer composition. The resultant polymer composition had a weight-average molecular weight of 7,000 and an acid value of 6.66 meq/g. Incidentally, 12 and 1 respectively were the numbers of end carbon atoms in the respective main chains of two graft polymers as contained in the resultant polymer composition, therefore the difference therebetween was 11.

The following evaluations were carried out as to the present invention graft polymer compositions as obtained in the above Examples and the comparative polymers as obtained in the above Comparative Examples.

<Calcium Ion Scavengeability>

Calcium ion standard solutions for drawing a calibration curve were prepared by the following steps of: preparing 50 g each of 0.01 mol/l, 0.001 mol/l, and 0.0001 mol/l aqueous solutions of calcium chloride dihydrate, and then adjusting their pH into the range of 9 to 11 with a 4.8% aqueous NaOH solution, and then adding thereto 1 ml of a 4 mol/l aqueous potassium chloride solution (hereinafter, abbreviated as "aqueous 4M-KCl solution"), and then sufficiently stirring the resultant mixture with a magnetic stirrer, thus preparing the sample solutions for drawing the calibration curve. In addition, a 0.001 mol/l aqueous solution was prepared as a test calcium ion standard solution from the calcium chloride dihydrate.

Next, 10 mg (in terms of solid content) of a test sample (polymer or polymer composition) was weighed out into a beaker of 100 ml, and then thereto 50 g of the test calcium ion standard solution was added, and then the contents of the beaker were stirred with a magnetic stirrer enough. Furthermore, the pH of the resultant mixture was adjusted into the range of 9 to 11 with a 4.8% aqueous NaOH solution, and then thereto 1 ml of the aqueous 4M-KCl solution was further added, and then the contents of the beaker were stirred with a magnetic stirrer enough, thus preparing a test sample solution.

The sample solutions for drawing the calibration curve and the test sample solution, as prepared in the above ways, were measured by the amount of calcium ion with a calcium ion electrode ("93–20" produced by OLION Co.) and a comparative electrode ("90–01" produced by OLION Co.) using a titration apparatus ("COMTITE-550" produced by Hiranuma Sangyo Co., Ltd.). Then, the amount of calcium ion, as scavenged by the sample, was determined by calculation from the measured values of the sample solutions for drawing the calibration curve and the test sample solution. Then, the determined amount per g of the solid content of the polymer (or polymer composition) was denoted by the milligrams in terms of calcium carbonate, and from this value the calcium ion scavengeability was evaluated. The results are listed in Table 1.

TABLE 1

|  | Calcium ion scavengeability value |
| --- | --- |
| Example 1 | 85 |
| Example 2 | 113 |
| Example 3 | 80 |
| Example 4 | 120 |
| Example 5 | 68 |
| Example 6 | 67 |
| Example 7 | 66 |
| Example 8 | 118 |
| Comparative Example 1 | 63 |
| Comparative Example 2 | 65 |
| Comparative Example 4 | 72 |

<Clay Dispersibility>

A buffer (1) was prepared by adding pure water to 67.56 g of glycine, 52.6 g of sodium chloride, and 2.4 g of NaOH to adjust the total weight to 600 g. To 60 g of this buffer (1), then, 0.0817 g of calcium chloride dehydrate followed by pure water was added to adjust the total weight to 1,000 g, thus preparing a buffer (2). Next, a dispersion was prepared by adding 36 g of the buffer (2) to 4 g of 0.1 weight % (in terms of solid content by weight) aqueous solution of the test sample (polymer or polymer composition) and then stirring them.

A test tube (produced by Maruemu, a rimmed test tube having a standard line, 30 ml: diameter 18 mm×height 180 mm) was charged with 0.3 g of clay (produced by Japan Powder Industrial Technical Society (incorporated body), 11 types of JIS test dust 1 (Lot. No. P0011001)), and thereto 30 g of the above dispersion was thereafter added, and then the test tube was sealed. Then, the test tube was shaken to uniformly disperse the clay, and then allowed to stand stationary for 20 hours in a place as not exposed to direct sunlight. After 20 hours, 5 cc of supernatant of the dispersion was sampled to measure its absorbance (A) with a UV spectroscope (produced by Shimadzu Corporation, UV-1200: 1 cm cell, wavelength=380 nm). Separately, the absorbance (B) of poly(sodium acrylate) ("DL-40S" produced by Nippon Shokubai Co., Ltd., weight-average molecular weight=7,000) was also measured in the same way. The dispersibility value was calculated according to the following equation:

Dispersibility value=absorbance (A)/absorbance (B)

The results are listed in Table 2.

TABLE 2

|  | Clay dispersibility value |
| --- | --- |
| Example 1 | 0.815 |
| Example 2 | 0.888 |
| Example 3 | 0.739 |
| Example 4 | 0.719 |
| Example 8 | 0.872 |
| Comparative Example 1 | 0.701 |
| Comparative Example 2 | 0.356 |
| Comparative Example 4 | 0.462 |

<Anti-Redeposition Property>

An amount of 1 L of aqueous detergent solution containing a test sample (polymer or polymer composition) in a concentration of 35 ppm (in terms of solid content) was prepared in such a manner that the concentration of surfactants (SFT-70H, NEOPELEX F-65, QUARTAMIN 86W) would be 350 ppm in accordance with the following combination into a detergent:

SFT-70H (produced by Nippon Shokubai Co., Ltd., polyoxyethylene alkyl ether); 40 g NEOPELEX F-65 (produced by Kao Corporation, sodium dodecylbenzenesulfonate); 7.7 g (effective component content=5 g)

QUARTAMIN 86W (produced by Kao Corporation, stearyltrimethylammonium chloride); 17.9 g (effective component content=5 g)

Diethanolamine; 5 g

Ethanol; 5 g

Propylene glycol; 5 g

Water (hardness: 3° DH (53.6 ppm in terms of calcium carbonate)); 19.4 g

Added to 1 L of this aqueous detergent solution were clay (11 types of test dust: Kanto loam, super fine particles (available from Japan Powder Industrial Technical Society)) and 8 pieces of white cloth (JIS-L0803, cotton cloth (Kanakin #3)) as cut into the size of 5 cm×5 cm. Then, a Terg-O-Tometer was used to thrice repeatedly carry out a process comprising the steps of washing (washing time: 10 minutes (Terg-O-Tometer 100 rpm)) and rinsing (rinsing time: 2 minutes (Terg-O-Tometer 100 rpm)) at a water temperature of 25° C.

The respective reflectances (Hunter's whiteness degrees) of 8 pieces of the unwashed white cloth (original cloth) (A) and 8 pieces of the washed and rinsed contaminated cloth (B) were measured with a color difference meter ("SE2000" produced by Nippon Denshoku Kogyo Co., Ltd.), and each average value thereof was used to determine the anti-redeposition ratio according to the following equation:

Anti-redeposition ratio (%)=(reflectance of contaminated cloth (B))/(reflectance of white cloth (A))×100

Incidentally, for comparison, the same test as the above was also carried out for a case of no addition of the test sample (polymer or polymer composition). The results are listed in Table 3.

TABLE 3

|  | Anti-redeposition ratio (%) |
| --- | --- |
| Example 2 | 77.7 |
| Example 3 | 73.9 |
| Example 4 | 77.4 |
| Example 6 | 75.2 |
| Comparative Example 1 | 73.3 |
| Comparative Example 2 | 75.2 |
| No addition | 67.7 |

<Detergency>

An amount of 500 ml of aqueous detergent solution containing a test sample (polymer or polymer composition) in a concentration of 35 ppm (in terms of solid content) was prepared in such a manner that the concentration of surfactants (SFT-70H, NEOPELEX F-65, QUARTAMIN 86W) would be 350 ppm in accordance with the following combination into a detergent:

SFT-70H (produced by Nippon Shokubai Co., Ltd., polyoxyethylene alkyl ether); 40 g NEOPELEX F-65 (produced by Kao Corporation, sodium dodecylbenzenesulfonate); 7.7 g (effective component content=5 g)

QUARTAMIN 86W (produced by Kao Corporation, stearyltrimethylammonium chloride); 17.9 g (effective component content=5 g)

Diethanolamine; 5 g

Ethanol; 5 g

Propylene glycol; 5 g

Water (hardness: 3° DH (53.6 ppm in terms of calcium carbonate)); 19.4 g

Added to 500 ml of this aqueous detergent solution were 5 pieces of artificially contaminated wet cloth (produced by the Japanese Laundry Research Association). Then, a Terg-O-Tometer was used to carry out a process comprising the steps of washing (washing time: 10 minutes (Terg-O-Tometer 100 rpm)) and rinsing (rinsing time: 2 minutes (Terg-O-Tometer 100 rpm)) at a water temperature of 25° C.

The respective reflectances (Hunter's whiteness degrees) of 5 pieces of the unwashed contaminated cloth (a) and 5 pieces of the washed and rinsed contaminated cloth (b) were measured with a color difference meter ("SE2000" produced by Nippon Denshoku Kogyo Co., Ltd.), and each average value resultant therefrom and the reflectance, as measured in the same way, of white cloth (JIS-L0803, cotton cloth (Kanakin #3)) (a') were used to determine the washing ratio according to the following equation:

Washing ratio (%)=[{(reflectance of washed contaminated cloth (b))−(reflectance of unwashed contaminated cloth (a))}/{(reflectance of white cloth (a'))−(reflectance of unwashed contaminated cloth (a))}]×100

Incidentally, for comparison, the same test as the above was also carried out for a case of no addition of the test sample (polymer or polymer composition). The results are listed in Table 4.

TABLE 4

|  | Washing ratio (%) |
| --- | --- |
| Example 2 | 42.8 |
| Example 3 | 42.7 |

TABLE 4-continued

|  | Washing ratio (%) |
| --- | --- |
| Example 4 | 52.2 |
| Example 6 | 45.2 |
| Comparative Example 1 | 42.4 |
| Comparative Example 2 | 45.0 |
| No addition | 38.6 |

<Compatibility with Liquid Detergents>

A detergent composition containing a test sample (polymer or polymer composition) was prepared in accordance with the following combination into a detergent:

SFT-70H (produced by Nippon Shokubai Co., Ltd., polyoxyethylene alkyl ether); 40 g NEOPELEX F-65 (produced by Kao Corporation, sodium dodecylbenzenesulfonate); 7.7 g (effective component content=5 g)

QUARTAMIN 86W (produced by Kao Corporation, stearyltrimethylammonium chloride); 17.9 g (effective component content=5 g)

Diethanolamine; 5 g
Ethanol; 5 g
Propylene glycol; 5 g
Test sample (in terms of solid content); 1.5 g
Ion-exchanged water; balance*

*The amount of the ion-exchanged water is fitly adjusted in such a manner that the total of the above materials will be 100 g on condition that the amount of the test sample is regarded as that actually used.

The above components were sufficiently stirred in order to uniformly blend them, and the turbidity value at 25° C. of the resultant detergent composition was measured as Turbidity (kaolin turbidity: mg/l) with a turbidimeter ("NDH2000" produced by Nippon Denshoku Kogyo Co., Ltd.). Incidentally, for comparison, poly(sodium acrylate) (weight-average molecular weight=7,000; "DL-40S" produced by Nippon Shokubai Co., Ltd.) was used to carry out the same test as the above. The results are listed in Table 5.

TABLE 5

|  | Turbidity value (mg/L) |
| --- | --- |
| Example 1 | 1 |
| Example 2 | 1 |
| Example 3 | 1 |
| Example 4 | 2 |
| Example 5 | 85 |
| Example 6 | 20 |
| Example 7 | 4 |
| Comparative Example 1 | 928 |
| Comparative Example 4 | 942 |
| PSA * | 907 |

* Poly(sodium acrylate)

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A polymer composition, which comprises at least two polymers including a first polymer and a second polymer, where each of said polymers are obtained by a process including the step of polymerizing a monoethylenically unsaturated monomer component onto a chain including a polyether portion and where at least one of said first and second polymers have at least one end structural unit having at least one carbon atom, wherein the monoethylenically unsaturated monomer component includes an unsaturated carboxylic monomer as an essential component, with the polymer composition being characterized in that the difference between the number of carbon atoms in the end structural unit of said first polymer and the number of carbon atoms of an end structural unit of said second polymer is not less than 3, where said structural units are located at both ends of the respective main chain including said polyether portion and where:

(i) said end structural unit of a respective polymer is defined as a portion extending from each end ether bond portion, and when there is a difference in number of carbon atoms between the end structural units at each end of the respective polymer, the number of carbon atoms in the end structural unit of the respective polymer is defined as the end structural units of the respective polymer having the largest number of carbon atoms; and (ii) when a chain of a polyether of a respective polymer is derived from an alkylene oxide alone, the number of carbon atoms in the respective end structural unit of the respective polymer is defined as zero.

2. A polymer composition according to claim 1, wherein the number of carbon atoms in an end structural unit containing the smallest number of carbon atoms of said end structural units of each end of the respective chains of the at least two polymers is not larger than 5.

3. A polymer composition according to claim 1, which has an acid value of not less than 2.0 meq/g.

4. A polymer composition according to claim 2, which has an acid value of not less than 2.0 meq/g.

5. A polymer composition according to claim 1, wherein a polymer having an end structural unit containing the largest number of carbon atoms of the end structural units of both ends of the respective chains including the polyether portion of the at least two polymers accounts for not less than 30 weight % of the entirety of the polymers.

6. A polymer composition according to claim 2, wherein a polymer having an end structural unit containing the largest number of carbon atoms of the end structural units of both ends of the respective chains including the polyether portion of the at least two polymers accounts for not less than 30 weight % of the entirety of the polymers.

7. A polymer composition according to claim 3, wherein a polymer having an end structural unit containing the largest number of carbon atoms of the end structural units of both ends of the respective chains including the polyether portion of the at least two polymers accounts for not less than 30 weight % of the entirety of the polymers.

8. A polymer composition according to claim 4, wherein a polymer having an end structural unit containing the largest number of carbon atoms of the end structural units of both ends of the respective chains including the polyether portion of the at least two polymers accounts for not less than 30 weight % of the entirety of the raft polymers.

9. A production process for a polymer composition, which comprises the step of adding a monoethylenically unsaturated monomer component to a mixture of at least two polyether compounds in order to polymerize the monoethylenically unsaturated monomer component at the same time onto the at least two polyether compounds, wherein the monoethylenically unsaturated monomer component includes an unsaturated carboxylic monomer as an essential component;

wherein the difference between the number of carbon atoms in an end structural unit of a first of said polyether compounds and the number of carbon atoms in an end structural unit of a second of said polyether compounds is not less than 3 where:
(i) said end structural unit of a respective polyether compound is defined as a portion extending from each end ether bond portion, and when there is a difference in number of carbon atoms between the end structural units of each respective polyether compound, whichever is larger is defined as the number of carbon atoms in the respective end structural unit; and
(ii) when an end structural unit is derived from an alkylene oxide alone, the number of carbon atoms in the respective end structural unit is defined as zero.

10. A production process according to claim 9, wherein the number of carbon atoms in an end structural unit containing the smallest number of carbon atoms of said end structural units of each end of the respective chains of the at least two polyether compounds is not larger than 5.

11. A production process according to claim 10, wherein the resultant polymer composition has an acid value of not less than 2.0 meq/g.

12. A production process according to claim 10, wherein a polyether compound having an end structural unit containing the largest number of carbon atoms of the end structural units of both ends of the respective chains of the at least two polyether compounds accounts for not less than 30 weight % of the entirety of the polyether compounds.

13. A production process for a polymer composition, which comprises the step of blending polymers (A) and (A') together, wherein:
the polymer (A) is obtained by polymerizing a monoethylenically unsaturated monomer component onto a polyether compound (a) having an end structural unit, wherein the monoethylenically unsaturated monomer component includes an unsaturated carboxylic monomer as an essential component; and
the polymer (A') is obtained by polymerizing a monoethylenically unsaturated monomer component onto a polyether compound (a') having an end structural unit, wherein the monoethylenically unsaturated monomer component includes an unsaturated carboxylic monomer as an essential component;
wherein the difference between the number of carbon atoms in said end structural unit of said polyether compound (a) and the number of carbon atoms in each end structural unit of said polyether compound (a') is not less than 3, where:
(i) said end structural unit of a respective polyether compound is defined as a portion extending from each end ether bond portion, and when there is a difference in number of carbon atoms between the end structural units of each respective polyether compound, whichever is larger is defined as the number of carbon atoms in the respective end structural unit; and
(ii) when an end structural unit is derived from an alkylene oxide alone, the number of carbon atoms in the respective end structural unit is defined as zero.

14. A production process according to claim 13, wherein the number of carbon atoms in an end structural unit containing the smallest number of carbon atoms of said end structural units of each end of the respective chains of the polyether compounds (a) and (a') is not larger than 5.

15. A production process according to claim 14, wherein the resultant polymer composition has an acid value of not less than 2.0 meq/g.

16. A production process according to claim 14, wherein a polyether compound having an end structural unit containing the largest number of carbon atoms of said end structural units of both ends of the respective chains of the polyether compounds (a) and (a') accounts for not less than 30 weight % of the entirety of the polyether compounds.

17. A liquid-detergent builder, which comprises the polymer composition as recited in claim 1 as an essential component.

18. A liquid-detergent builder, which comprises the polymer composition as recited in claim 2 as an essential component.

19. A liquid detergent composition, which comprises the polymer composition as recited in claim 1 as an essential component.

20. A liquid detergent composition, which comprises the polymer composition as recited in claim 2 as an essential component.

21. The polymer composition according to claim 1, wherein the number of carbon atoms of said end structural units is defined as zero when said polyether includes only hydroxy terminal end structural units.

22. The process of claim 9, wherein the number of carbon atoms of said end structural units is defined as zero when said polyether includes only hydroxy terminal end structural units.

* * * * *